Figure 1:
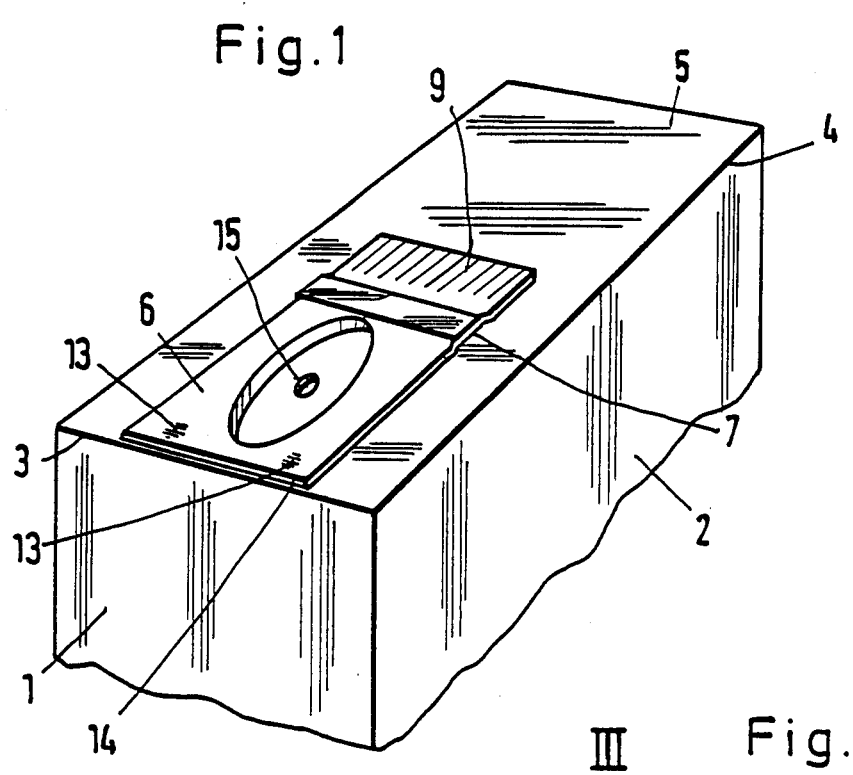

United States Patent [19]

Stark

[11] Patent Number: 4,730,769
[45] Date of Patent: Mar. 15, 1988

[54] PACKAGING FOR LIQUIDS AND PROCESS AND APPARATUS FOR ITS MANUFACTURE

[75] Inventor: Sven O. S. Stark, Ystad, Sweden

[73] Assignee: Tetra Pak International AB, Lund, Sweden

[21] Appl. No.: 850,932

[22] Filed: Apr. 11, 1986

[30] Foreign Application Priority Data

Apr. 18, 1985 [DE] Fed. Rep. of Germany ....... 3513976

[51] Int. Cl.⁴ .............................................. B65D 5/72
[52] U.S. Cl. ......................... 229/125.15; 229/125.33; 229/125.34; 220/359
[58] Field of Search ............. 229/17 R; 220/256, 258, 220/359

[56] References Cited

U.S. PATENT DOCUMENTS

| 3,389,827 | 6/1968 | Abere et al. | 220/359 |
| 3,613,986 | 10/1971 | Christensson | 229/17 R |
| 3,900,155 | 8/1975 | Rausing et al. | 229/17 R |
| 4,372,460 | 2/1983 | Brochman et al. | 220/258 |
| 4,585,498 | 4/1986 | Lagerstedt et al. | 220/359 |

Primary Examiner—Willis Little
Attorney, Agent, or Firm—Paul & Paul

[57] ABSTRACT

Described is a packaging for liquid, made of cardboard, which is made impermeable to liquid by means of a plastic coating over its surface. It has side-walls, base and top wall (5), connected to one another by folded and/or sealed seams. A pouring aperture is located in top wall (5) close to the edge line, and can be torn off and has a separate plastic strip (8) covering the pouring aperture and being applied round the edge of the pouring aperture, and is sealed on at least from the inside.

So that the edge of the pouring aperture remains covered with a protective layer after opening and so that the closure and the protective layer can be produced with simple means, according to the invention the plastic strip (8) covers the pouring aperture tightly and is fixed via two tacked strips (7, 31) to an outer cover strip, in which a hole (15) is located above the pouring aperture, the two tacked strips being smaller than the surface area of cover strip (6), the first tacked strip (7) being applied at a distance from hole (15) and outside the pouring aperture, the second tacked strip (31) being applied outside hole (15) of cover strip (6) and within the pouring aperture (16), the outer cover strip (6) being fixed to the top wall (5) of the packaging via a third tacked strip (9) lying outside the plastic strip (8).

8 Claims, 7 Drawing Figures

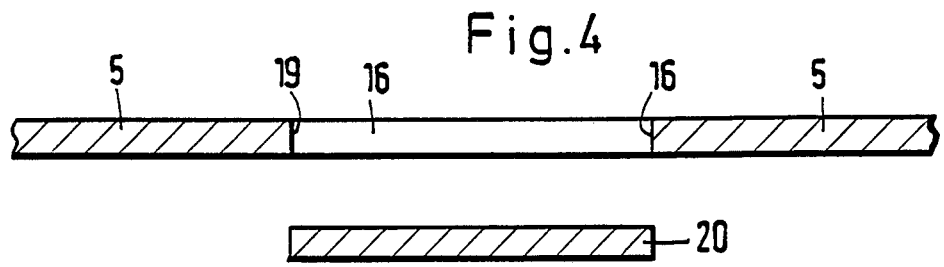
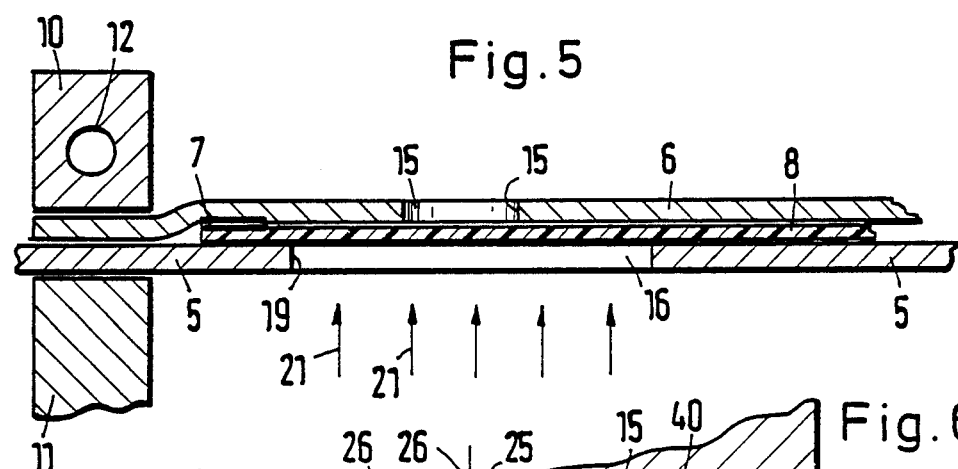
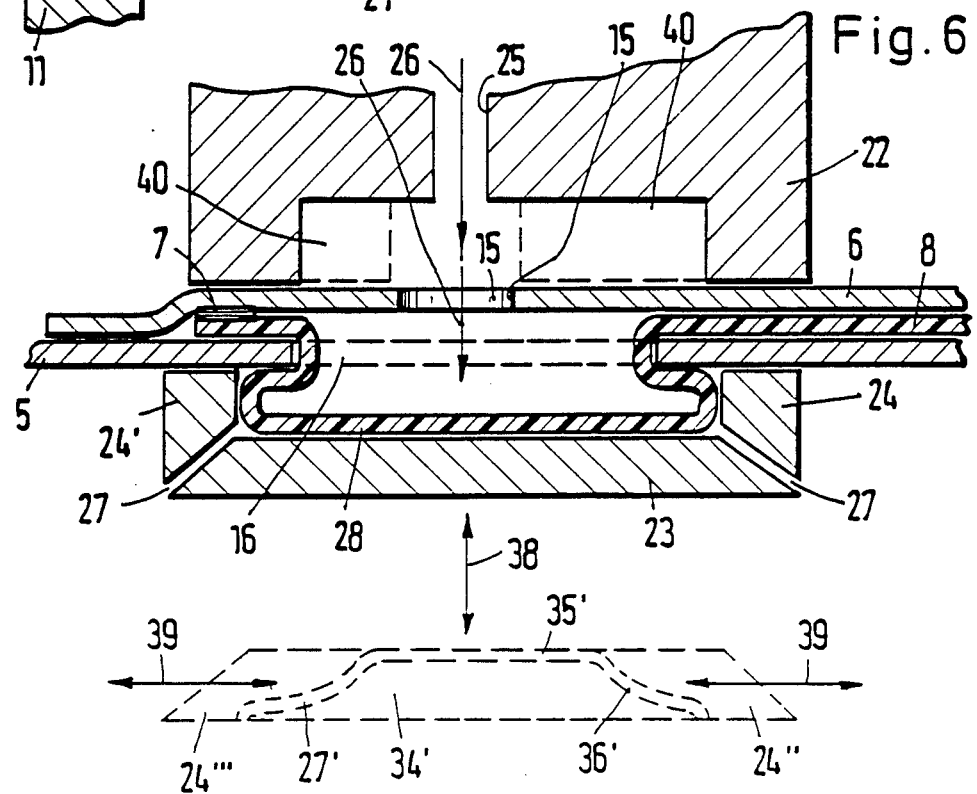

PACKAGING FOR LIQUIDS AND PROCESS AND APPARATUS FOR ITS MANUFACTURE

The invention relates to a packaging for liquid, made of cardboard or similar material, which on at least one of its surfaces is made impermeable to liquid by plastic coating, and which has side-walls, bottom and top walls, which are connected to each other at least partially by a fold, and/or sealed-seams, with a tear-off pouring aperture located in the top wall, close to the edge, and which has a separate plastic strip which in the zone of the pouring aperture at least covers the latter and which is applied round the edge of the pouring aperture and sealed on at least from the underneath.

The DE-PS No. 24 07 345 already makes known a packaging for liquids similar to that described above. In the pouring aperture in the known case a thermoplastic, e.g. Polystyrol, strip is applied to the outside of the packaging by heat-forming and partial sealing. It is accordingly known to heat a plastic strip and form it with a press tool in such a way that the bottom surface of this known hollow cover applied to the inside of the pack is larger than the surface area of the pouring aperture. This gives a certain snap-action, so that the hollow cover sits with some degree of firmness in the pouring aperture even without sealing onto the outside of the package. To open the package the complete hollow cover is drawn out, so that the pouring aperture is laid bare and the liquid can be poured out by tilting the packaging. The known hollow cover can also be snapped back in behind the edges of the pouring aperture to reclose.

A disadvantage with this known type of packaging is that the edge of the pouring aperture is exposed without plastic coating as a result of the punching operation or cutting operation. When liquid is poured over this edge or if a residual quantity of liquid after reclosing in some other way reaches this free edge from above, then the carrier material web, as a result of capillary action, sucks the liquid in at the edge of the pouring aperture and thus loses its stiffness and becomes unhygienic.

The object of the invention is the making of a packaging for liquid of the type described in detail above with which the edge of the pouring aperture after opening of the pouring device remains covered with a protective coating, a particularly advantageous feature being that the closure for the pouring aperture and the protective coating round the edge of the pouring aperture are made with simple means and with apparatus which is practical as possible.

This object is achieved for the packaging for liquid itself according to the invention in that the plastic strip covers the complete pouring aperture tightly and is fixed via two tacked strips to an outer cover strip in which a hole is located in the zone above the pouring aperture, in that both tacked strips are smaller than the surface area of the cover strip, the first tacked strip being applied at a distance from the hole and outside the pouring aperture, the second tacked strip being applied outside the hole of the cover strip and within the pouring aperture, and in that the outer cover strip is fixed via a third tacked strip lying outside the plastic strip to the top wall of the packaging. By these measures it is possible simply and rapidly, i.e. with only a few work steps on the packaging manufacturing machine, to close the pouring aperture liquid-tight and protect the edges of the pouring aperture, both after as well as before opening by means of a protective covering against penetration by moisture. Although it is already known to fix an outer cover strip via a tacked strip to the top wall of the packaging, this method cannot prevent penetration by liquid into the edge of the pouring aperture opened by the cut (lack of edge protection). Particularly advantageously, the plastic strip applied to the outer cover strip is sealed on outside the edge of the pouring aperture in the form of a continuous loop, onto the side of the top wall of the packaging which subsequently becomes the inside of the liquid packaging. This guarantees complete edge protection, since under these conditions the liquid cannot penetrate from any side into the edge of the carrier material web exposed by the cut. The carrier material consists in practice of paper or cardboard, whilst a plastic strip and also plastic coating are thermoplastic materials. In a known way the individual layers and strips can be superimposed on one another without requiring adhesives for fixing (i.e. by sealing).

A particularly advantageous feature according to the invention is the passing of the first tacked strip in a band across the outer cover strip, and the surrounding of the entire hole in the cover strip by the second tacked strip. The said first tacked strip constitutes, according to the process, the first connection between the plastic strip and the outer cover strip. If both strips are e.g. rectangular in shape, in order to simplify the aperture device as a whole they can be made by cutting from a longer strip. The band-form first tacked strip can then be advantageously laid in the longitudinal direction of the longer strip from which the individual cover strips are cut cross-wise. In this way in the longitudinal direction of a band a tacked strip can be provided along which the plastic strip can be very simply applied. The product obtained is then a wider band, the width of which is equal to the length of the individual cover strip resp. of the plastic strip lying on it. By means of cross-cuts over the width of this larger band, the above mentioned outer cover strips can then be cut off.

On the other hand the second tacked strip goes right round the hole in the cover strip. It is particularly advantageous here to have the radial outer edges of the second tacked strip running close to the edge of the pouring aperture. The arrangement of the second tacked strip in fact then defines the pouring aperture after the tearing off of the cover strip resp. plastic strip.

The hole in the outer cover strip does, it is true, also have an uncovered outer face at the cut into which liquid could penetrate, but the outer cover strip does not, however, in general, come into contact with the liquid, so that edge protection is not required here for this purpose.

To summarise, therefore, the form and arrangement of the first tacked strip have a practical manufacturing purpose; the form and arrangement of the second tacked strip serving the commencement and execution of the opening operation.

A further advantage of the invention is that the third tacked strip, looked at in tear-off direction of the cover strip, is applied behind the pouring aperture. Via this third tacked strip the cover strip is fixed to the top wall of the liquid packaging. To the engineer it is clear that only a small surface area is required for this third tacked strip. It is thus particularly advantageous if for opening the tear-off operation starts at the pouring edge, so that the initial tear starts at the front point, looking in tear-off direction of the cover strip, of the said second tacked strip, and once the complete second tacked strip has been detached is essentially completed, because the pouring aperture is then opened.

The length of the outer cover strip (looked at in tear-off direction) can be equal to the length of the plastic strip fixed to it. To ensure a neat appearance to the top wall of the packaging it may be desirable to have the cover strip always at least as big as the plastic strip located undereneath it when looked at from the top. To form a pouring edge, however, the plastic strip can also extend forward (against tear-off direction) over the next edge line, whereby its front end remains seal-free in the region of the edge line and thus gives a favourable pouring edge. However, the outer cover strip can be made the same size as, or shorter than, the plastic strip.

The object described above is achieved by means of a process in which on the area occupied by the pouring aperture punched out of the top wall a plastic strip covering the opening is sealed on in such a way that the surface lying over the pouring aperture is drawn down to a level below that of the top wall in a cup shape; and according to the invention this objective is achieved in a particularly advantageous way in that to deep-draw a gaseous fluid is blown through a hole in the cover strip onto the plastic strip and the bottom of the deep-drawn cup-shape is shaped in such a way that the base surface area is larger than the pouring aperture, and is then sealed against the bottom ring surface outside the edge of the pouring aperture along a fourth tacked strip. The gaseous fluid used particularly advantageously according to the invention is compressed air, which presses through the hole in the cardboard cover strip directly onto the plastic strip and presses it into a corresponding mould, i.e. the clamping tool. The base of the cup is given a larger area than that of the pouring aperture, which can be achieved in different ways as a function of tool movement and shape. Similarly the sealing of the open edge of the pouring aperture is ensured by the above mentioned fourth tacked strip in a simple way because the material of the already present deep-drawn bottom can be used as edge protection and fixing for the latter. The fourth tacked strip lies outside the edge of the pouring aperture and in a ring on the side of the top wall which subsequently forms the inside of the packaging.

It is advantageous to first apply to the material web for the liquid packaging the complete aperture device in the way described here and only then to close the opposite side of the pack after filling. In this way the top wall can be brought between a wide range of different moving tools and pressure applied from both sides, i.e. pressure and counter-pressure to the top wall and the layers applied to it.

It is particularly advantageous according to the invention if the plastic strip together with the cover strip with the hole fixed to it is applied to the area of the pouring aperture and is fixed only on one side of the pouring aperture and at a distance of the latter before deep-drawing on the top wall of the packaging. The advantageous method of making the new opening device has already been described above, i.e. first the unit consisting of plastic and cover strips is made, and then this double-layer strip is applied to the area of the pouring aperture and is fixed to the top wall of the packaging at a point which must not be too large. This latter point is constituted by the so-called third tacked strip which in conformity with the method described above is produced directly before the deep-drawing of the plastic strip. To achieve efficient opening, this third tacked strip is located in tear-off direction of the cover strip behind the pouring aperture and at a distance from the latter. On other sides of the pouring aperture the third tacked strip is not necessary, because it is intended solely to fix the double-layer strip, in particular the plastic strip, so that the deep-drawing operation can be started and executed rapidly and accurately.

The process described is further developed in that according to the invention before the plastic strip is deep-drawn, hot air is blown onto the plastic strip through the pouring aperture from the side facing away from the outer cover strip. This is a particularly simple, economic, fast and pollution-free method for preparing the plastic strip in the zone required for deep-drawing. In a practical fashion the pouring aperture itself is used as a slot or limiting surface so that i.e. only the plastic strip within the pouring aperture is heated and any sealed points (the first tacked strip) outside this area remain uninfluenced.

In this it has proved particularly advantageous if according to the invention the temperature of the hot air lies within the range between 300° C. and 500° C. The temperature and also the length of time for blowing on the hot air depends on the one hand on each other and on the other also on the volume of the plastic strip to be heated. The apparatus for manufacturing the opening device has a mandrel and counter-jaws and the above mentioned object is cleverly achieved in that the base part of the holding tool for the deep-drawn work piece is moveable and is equipped with heating or ultrasonic devices, whilst the opposite clamping jaws have a compressed air duct. In this way an extremely simple manufacturing apparatus is achieved. The broad band with the cross-wise double-layer strips (outer cover strip and plastic strip) is fed from a roll, from which the respective double-layer strip can be cut off by a simple knife, and then a gripper brings these individual strips over the punched-out pouring aperture into position. A sealing jaw with counter-jaw fixes these strips onto the top wall, the deep-drawing and welding tool thus being charged and the remaining operations carried out in a single station. The time between fixing the double-layer strip on the top wall and its charging in the deep-drawing and welding tool is at the same time used to blow the hot air in the described manner onto the plastic strip within the pouring aperture.

It can be seen that by means of the measures described above with a very simple working tool the opening device together with the advantages of good pouring, tightness, and edge protection can be achieved rapidly and simply. Also, instead of paper, an aluminimum foil material can also be used for the outer cover strip, this being advantageously covered on one side at least with plastic.

Further advantages, features and possibilities of application of the invention described here can be derived from the following description of an embodiment of the invention in relation to the drawings. These show:

FIG. 1. A perspective view of the top part of a packaging for liquid with pouring aperture and tear-off strip, the sealed seams of the folded packaging not being shown, FIG. 2. A top view on the broad band with the cross-wise cover and plastic strips, FIG. 3. A cross-sectional view of a section along the line III—III of FIG. 2, FIG. 4. A schematic and broken-off cross section of the top wall of the packaging for liquid, out of which the pouring aperture is punched, this being shown at a distance below, FIG. 5. A schematic view of the broken cross section through the top wall of the packaging in the zone of the pouring aperture with double-layer cover and plastic strips applied in the application of this double-layer strip to the top side of the packaging, FIG. 6. In an identical view the zone shown in FIG. 5 of the top wall of the packaging whereby the shaping tool is applied, the base of the latter in an alternative embodiment being shown in FIG. 6 in broken lines below in several parts and moveable and FIG. 7. Also in a broken and schematic view a cross section through the zone of the top wall of the packaging after the tear-off seal has been made.

When the packaging for liquid has been made it has e.g. the appearance shown in FIG. 1, where, of course, the transverse and/or longitudinal sealed seams of the package are omitted. Of the four side walls, the front narrow side wall 1 and broad side wall 2 can be seen, connected via fold lines 3 and 4 to top wall 5. The front fold line between the narrow side wall 1 and the top wall 5 is an edge line over which the jet of poured liquid flows when the packaging is used.

In the zone close to edge line 3 in the top wall 5 there is the outer cover strip 6 which is connected via the first tacked strip 7 with the plastic strip invisible underneath as shown in FIG. 1, this being made clear in FIGS. 2, 3 and 5 to 7 and drawn in FIG. 8. Along the third tacked strip line shown in FIG. 7 (shaded zone in FIG. 1) the outer cover strip, in this case cardboard or paper as carrier material, is fixed to top wall 5. This fixing is achieved via the heating jaws 10 with counter-jaws 11 as shown in FIG. 5, whereby the tempering medium can flow through the round aperture 12. Also in FIG. 11, two smaller zones 13 are shown via which the cover strip 6 and/or plastic strip 8 is connected to the top wall 5 by point-welding, whilst the pouring edge 14 remains weld-free.

Figure 7:
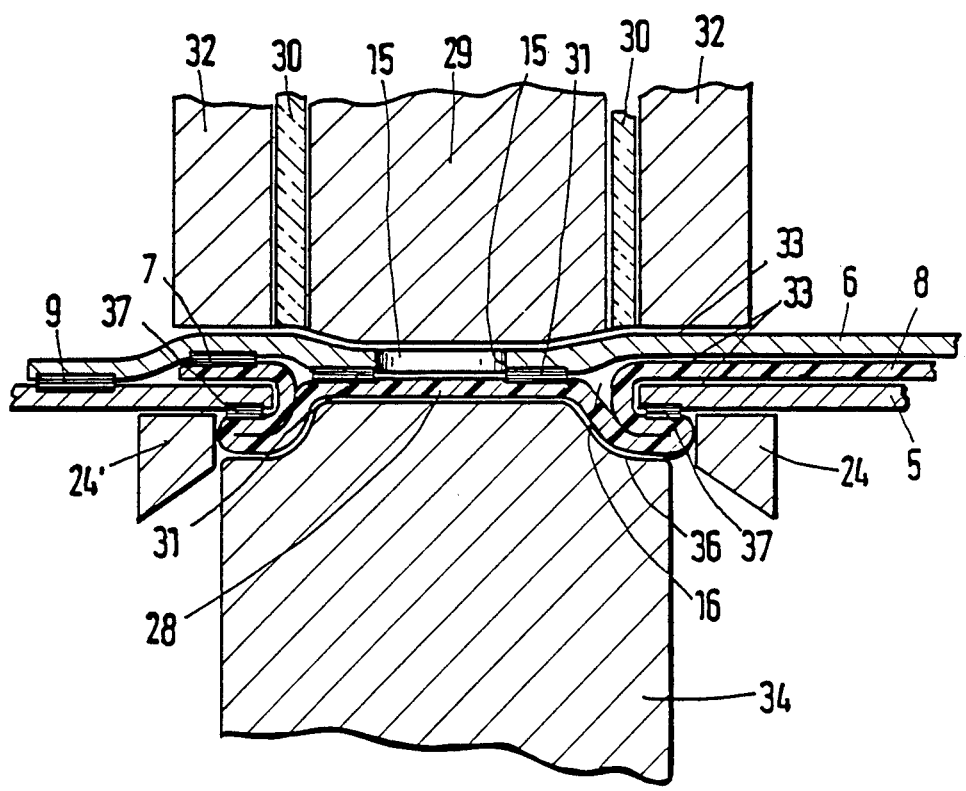

In the top view shown in FIG. 1, hole 15 in outer cover strip 6 can be seen, which in the area of pouring aperture 16 is in a deepened position, as can also be seen in FIG. 7. Opposite is cover strip 6 raised over the first tacked strip 7, as can also be seen in FIGS. 1 and 7.

Figure 2:
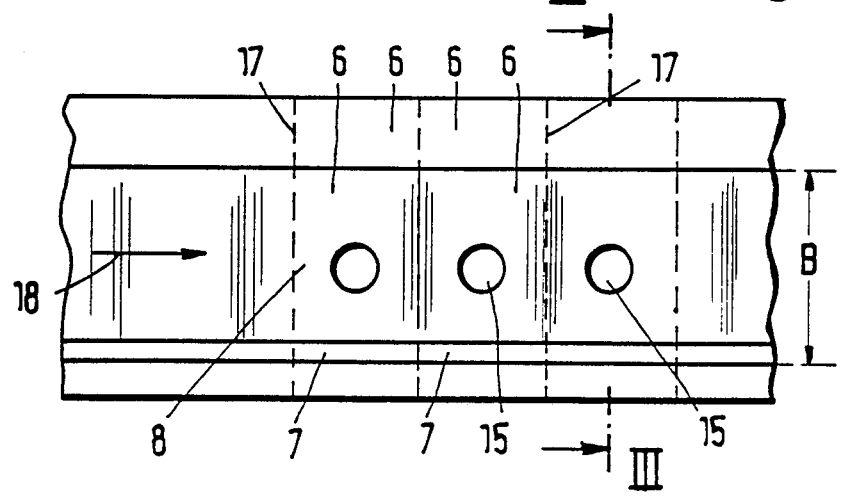
Figure 3:
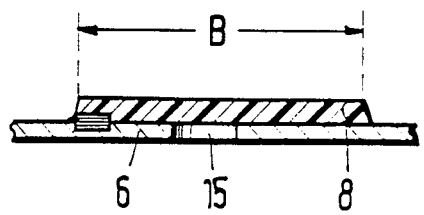

FIG. 2 shows the broad band of the double-layer strips 6, 8, whereby this cross-section is shown in FIG. 3 along the line III—III. In the top view from above, there is shown at the top first the plastic strip 8, which is transparent because it is a Polyethylene film, and its width B is indicated in FIGS. 2 and 3. Underneath this is the respective outer-cover strip 6, consisting of cardboard coated on both sides with Polyethylene and weldable. Along the broken line 17 the individual double-layer strips 6, 8 are cut-off from the band. The first tacked strip 7 can be seen as a band at one end of the plastic strip 8 and crossing over this. When the double-layer band is produced as shown in FIG. 2, this tacked strip 7 only requires application in feed direction 18 of this band 6, 7.

Plastic strip 8 is connected with colour strip 6 made of coated paper only via the first tacked strip 7, the connection with the top wall 5 of the packaging is achieved as described above in relation to FIG. 5 by welding, i.e. by producing the third tacked strip 9. Thus as a result cover strip 6 is fixed in the required position over the pouring aperture 16 with the uncoated cut edge 19.

FIG. 4 shows a cross section of the pouring aperture 16, out of which piece 20 has been punched, the latter then being thrown away. Edges 19 are without protective covering (edge protection), whilst on the large top surfaces above and below top wall 5 thin plastic coatings are possible in a manner known per se. Liquid could penetrate into these edges 19 which are exposed with the fibres facing outwards and the paper could, as a result, swell and be made unstable without the edge protection measures described below.

After the pouring aperture 16 has been punched out as shown in FIG. 4, the cover strip 6 with cover strip 8 applied as shown in FIG. 5 via the first tacked strip 7 is fixed via the third tacked strip 9 to the top wall 5. It can be seen that the plastic strip 8 completely covers the pouring aperture 16. On the top side of the plastic strip 8 shown in FIG. 5 there is located the hole 15, and on the underside and much larger than and e.g. concentric to it, there is located the pouring aperture 16, in top wall 5. Hot air at a temperature between 300° C. and 500° C. depending on the action time and volume of plastic strip 8 is blown in the direction shown by arrow 21 from the inside of package 5 through the pouring aperture 16 onto the plastic 8. This heats the plastic which then becomes capable of being deep-drawn.

FIG. 6 shows a further tool with counter-jaws 22 and clamping tool 23, 24, 24' holding the cover strip 6. In jaws 22 there is a gas duct 25, the outlet end of which is located approximately above hole 15 and above pouring aperture 16. From a compressed air source not shown, compressed air is blown in the direction shown by arrow 26 from above through hole 15 onto plastic strip 8, whilst via ducts 27 air can escape to the outside from clamping tool 23, 24. As a result plastic strip 8 is applied in the required shape to base part 23 and side sections 24, 24' of the moulding tool, so that base 28 of the part of the plastic strip 8 drawn down into cup shape is larger than the surface area of pouring aperture 16.

After the moulding tool 23, 24 has been removed, the final closing tool is applied as shown in FIG. 7. This tool consists of the counter-jaw 29 which can be tempered, and the outer counter-jaw 32 insulated by insulating material 30 in a similar annular shape to that of the second tacked strip 31 still to be mentioned, these jaws being capable of being cooled quickly. The purpose of this cooling is to avoid any additional tacked strip surface at point 33 where a connection between cover strip 6, plastic strip 8 and top wall 5 is to be avoided. The same applies to the opposite side, i.e. in FIG. 7 shown to the left above the first tacked strip 1, although here welding is not prejudicial to the above mentioned opening process. (Opening takes place as shown in FIG. 7 from right to left).

On the side located opposite counter-jaws 29, 32 in relation to top wall 5, there is the mandrel 34 with the required upper shape, i.e. with a centre raised piece 35 and ring-shaped groove 36 open on one side taking the double-layered ring-shaped parts of plastic strip 8.

In the final stage in manufacture shown in FIG. 7, the second tacked strip 31 is produced by ultrasonic means or by heating via mandrel 34 with counter-jaws 29, 32, this second tacked strip 31 completely surrounding on the outside hole 15 in cover strip 6 and being located very close to edge 19 of pouring aperture 16. This second tacked strip 31 must be strong because it is what produces the actual opening after tearing off.

When the mandrel 34 is raised not only is the ring-shaped material outside the second tacked strip 31 applied round the edge 19 of pouring aperture 16 and pressed up with the ring-shaped recesses 36 of mandrel 34, but at the same time also the annular fourth tacked strip 37 is made, which has a sealing action intended to and able to prevent penetration by liquid from the space below top wall 5 to edge 19 of pouring aperture 16.

With the packaging shown in FIG. 7, the plastic strip 8 is fixed to cover strip 6, both via the first tacked strip 7 and also via the second tacked strip 31 and—from the opposite side—via the fourth tacked strip 37.

FIG. 6 shows at the bottom mandrel 34' in broken line. This is a tool which combines the clamping and moulding tool with the mandrel and thus the work steps according to FIGS. 6 and 7. The mandrel is shown at the bottom of FIG. 6 as 34', and its raised surface 35' can again be seen with the groove shaped recess 36', in relation to which are arranged the outer jaws 24" right and 24'" left, venting ducts 27' being provided. As shown by double arrow 38, this unit 34', 24", 24'" is shown at the bottom of FIG. 6, and can be used instead of unit 23, and can be slid up and down in such a way that the side jaws 24" and 24'" as shown by double arrow 39 are laterally moveable in such a way that the top section 22 of the tool as shown in FIG. 6 when temperature insulation 30 is provided can be used also a counter-jaws instead of extra tools 29, 32. In this case, of course, the space below the top section 22 of the tool should be filled in as shown by the broken line 40 in order to ensure that these counter-jaws 22 cover the complete surface of the cover strip 6. In other words only the space between gas duct 25 and above hole 15 in cover strip 6 has to be left free so that the compressed air can flow through as shown by arrow 26.

What is claimed is:

1. In packaging for liquid, having surfaces made of cardboard or similar material, which on at least one of its surfaces is made impermeable to liquid by a plastic coating, and which has side-walls, bottom and top walls, which are connected to each other at least partially by connecting means, with a tear-off pouring aperture located in the top wall, close to an edge, and which has a separate plastic strip, which in the zone of the pouring aperture at least covers the latter and which is disposed around the edge of the pouring aperture and in sealed relation at least at the underneath portion thereof, and which also has an outer cover strip; characterised in that the plastic strip covers and seals the entire pouring aperture and is fixed via thereto at two sealing areas to the outer cover strip; in a hole located in a zone above the pouring aperture, in that with both sealing areas being smaller than the surface of the cover strip, the first sealing area being located at a distance from the hole and outside the pouring aperture, the second sealing area being located outside the hole in the cover strip and within the pouring aperture, and with the outer cover strip being fixed to the top wall of the package at a third sealing area lying outside the plastic strip.

2. Packaging for liquids according to claim 1, characterised in that the first sealing area is applied in a continuous band across the outer strip, and in that the second sealing area surrounds the complete hole in cover strip.

3. Packaging for liquids according to claim 1, characterised in that the third sealing area, looked at in tear-off direction of the cover strip, is applied behind the pouring aperture.

4. Method for the manufacture of an opening device in a package for liquid, including the steps of: providing a package made of cardboard or similar material, which on at least one of its surfaces is impermeable to liquid by plastic coating, and which has sidewalls and bottom and top walls, which are connected to each other at least partially by connecting means with a tear-off pouring aperture located in the top wall, close to an edge; applying a separate plastic strip around an edge of the pouring aperture to cover the zone of the pouring aperture; sealing the plastic strip at the zone of the pouring aperture at least from the underneath to seal the pouring aperture; applying an outer cover strip; sealing the strip by two sealing areas to the outer cover strip across a hole in the pouring aperture, with both sealing areas being smaller than the surface of the cover strip, with the step of sealing a first sealing area being accomplished by sealing it at a distance from the hole and outside the pouring aperture; with the step of sealing a second sealing area being accomplished by sealing it outside the hole in the cover strip and within the pouring aperture; sealing the outer cover strip by applying a third sealing area outside the plastic strip to the top wall of the package, with the plastic strip covering the aperture being sealed on in such a way that the surface of the plastic strip lying over the pouring aperture is drawn down to a level below the top wall in a cup-shape; forming the cup-shape by blowing a gaseous fluid through the hole in the cover strip onto the plastic strip, whereby the base of the deep-drawn cup thus formed is shaped in such a way that the base surface is greater than the surface area of the pouring aperature; and sealing the base surface against the lower ring surface below the edge of the pouring aperture along a fourth sealing area.

5. Process according to claim 14, characterised in that the plastic strip together with the cover strip with the hole attached to it is applied to the area of the pouring aperture and is fixed only on one side of the pouring aperture and at a distance from the latter before the deep-drawing onto the top wall of the pack.

6. Process according to claim 14, characterised in that before the deep-drawing of the plastic strip hot air is blown from the side facing away from the outer cover strip through pouring aperture onto the plastic strip.

7. Process according to claim 16, characterised in that the temperature of the hot air amounts to 300° C.

8. Apparatus for carrying out a process for the manufacture of an opening device in a package for liquid, wherein the package is made of cardboard or similar material, which on at least one of its surfaces is made impermeable to liquid by plastic coating, and which has side-walls and bottom and top walls, which are connected to each other at least partially by connecting means with a tear-off pouring aperture located in the top wall, close to an edge, including a separate plastic strip around an edge of the pouring aperture to cover the zone of the pouring aperture, means sealing the plastic strip at the zone of the pouring aperture at least from the underneath to seal the pouring aperture, means applying an outer cover strip, means sealing the strip by two sealing areas to the outer cover strip across a hole in the pouring aperture with both sealing areas being smaller than the surface of the cover strip, with the sealing means including means sealing the first sealing area at a distance from the hole and outside the pouring aperture, with the sealing means including means sealing the second sealing area outside the hole in the cover strip and within the pouring aperture, means sealing the outer cover strip by applying a third sealing area outside the plastic strip to the top wall of the package, with the plastic strip covering the aperture being sealed on the top wall in such a way to comprise means whereby the surface of the plastic strip lying over the pouring aperture is drawn down to a level below the top wall in a cup-shape, and wherein the means forming the cup-shape includes means blowing a gaseous fluid through the hole in the cover strip onto the plastic strip, whereby the base of the deep-drawn cup thus formed is shaped in such a way that the base surface is greater than the surface area of the pouring aperture, and means sealing the base surface against the lower ring surface below the edge of the pouring aperture along a fourth sealing area, the apparatus including a mandrel, counter-jaws, a bottom section for a clamping tool, and opposite counterjaws, characterized in that the bottom section of the clamping tool for the deep drawn cup is moveable and equipped with heating or ultra-sonic elements, and with the opposite counter-jaws having a compressed air duct passing therethrough.

* * * * *

UNITED STATES PATENT OFFICE
CERTIFICATE OF CORRECTION

Patent No. 4,730,769      Dated March 15, 1988

Inventor(s) Sven O. S. Stark

It is certified that error appears in the above-identified patent and that said Letters Patent are hereby corrected as shown below:

35 U.S.C. 254

In the Claims

Column 8, claim 5, line 33, change "14" to --4--.

Column 8, claim 6, line 40, change "14" to --4--.

Column 8, claim 7, line 43, change "16" to --6--.

Signed and Sealed this

Eighth Day of November, 1988

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,730,769

DATED : March 15, 1988

INVENTOR(S) : Sven O. S. Stark

It is certified that error appears in the above-identified patent and that said Letters Patent is hereby corrected as shown below:

Column 7, Claim 1, line 48, delete "via".

Column 7, Claim 1, line 49, after strips delete "in", first occurrence.

Column 7, Claim 1, Line 50, delete "in that".

Signed and Sealed this

Eighteenth Day of December, 1990

Attest:

HARRY F. MANBECK, JR.

*Attesting Officer*     *Commissioner of Patents and Trademarks*